VIDEO RECORDING AND/OR REPRODUCING APPARATUS AND METHOD

Filed March 19, 1958 4 Sheets-Sheet 1

JOSEPH ROIZEN
ROBERT F. PFOST
INVENTORS

BY [signature]
ATTORNEYS

JOSEPH ROIZEN
ROBERT F. PFOST
INVENTORS

BY [signature]
ATTORNEYS

VIDEO RECORDING AND/OR REPRODUCING APPARATUS AND METHOD

Filed March 19, 1958 4 Sheets-Sheet 3

JOSEPH ROIZEN
ROBERT F. PFOST
INVENTORS

BY [signature]
ATTORNEYS

JOSEPH ROIZEN
ROBERT F. PFOST
INVENTORS
BY Flehr and Swain
ATTORNEYS 3,037,073
Patented May 29, 1962

3,037,073

VIDEO RECORDING AND/OR REPRODUCING APPARATUS AND METHOD

Joseph Roizen, Palo Alto, and Robert F. Pfost, Mountain View, Calif., assignors to Ampex Corporation, Redwood City, Calif., a corporation of California Filed Mar. 19, 1958, Ser. No. 722,558
3 Claims. (Cl. 178—6.6)

This invention relates generally to a video recording and/or reproducing apparatus and method.

In copending applications Serial No. 524,004, filed July 25, 1955, now U.S. Patent No. 2,956,114, and Serial No. 427,138, filed May 3, 1954, now U.S. Patent No. 2,916,-546, there is disclosed a system and apparatus making use of a rotary head assembly for recording and/or reproducing signal intelligence which occupies a relatively wide frequency spectrum. The head assembly employs one or more transducer units or heads which are mounted to rotate and sweep across a pliable tape-like medium, such as that which is commonly known as magnetic tape. A concave guide holds the tape in cupped condition to conform to the sweep path of the transducing unit and to guide the same past the units. Means are employed for driving the head assembly and magnetic tape to assure proper speed of rotation of the head assembly and of the tape past the heads and to insure proper tracking of the head with the recorded track portions during playback.

Systems of the above character necessarily involve separate recorded track portions extending across the tape, each track portion being formed by the sweep of a transducing unit. During playback, current variations provided by each transducing unit as it sweeps across the track portions are combined to form a composite signal corresponding to the original recorded signal.

Video signals contain picture information and synchronizing information (timing waveforms). Generally, there are two types of synchronizing information; that which occurs during each horizontal scanning line, at a frequency of 15,750 c.p.s. for U.S. standard signals, and that which occurs during each frame, at a frequency of 60 c.p.s., for U.S. standard signals. In color video signals, the synchronizing signal frequencies are modified slightly giving a horizontal scanning frequency of 15,734 c.p.s. and a frame frequency of 59.94 c.p.s.

As is well known, the timing waveforms serve to synchronize a receiver. When a magnetic recording of the above character is spliced, the timing information is disturbed, the receiver loses synchronism, and the picture at the receiver is disturbed for several frames until the receiver regains synchronism.

It is desirable to provide a tape recording and reproducing system in which the tapes can be spliced, edited, etc., and in which the synchronizing (timing) information is not appreciably disturbed whereby the receiver does not lose synchronism when a reproduction occurs at a splice. It is also desirable to splice in such a manner that fields remain complete, that is, that the splice occurs at the end of one field and at the beginning of the next field whereby the complete field before and after the splice is reproduced and transmitted to the receiver.

It is a general object of the present invention to provide a recording apparatus and method for recording video signal intelligence in which the recording may be spliced, edited, etc., with minimum disturbance in the timing information.

It is another object of the present invention to provide a video recording and/or reproducing apparatus and method in which the video recording includes editing information.

It is another object of the present invention to provide a video signal recording and/or reproducing apparatus and method in which a recording including an editing signal having a predetermined time relationship with respect to the vertical synchronizing waveforms is recorded.

It is another object of the present invention to provide a video recording and/or reproducing apparatus and method including a plurality of transducer units which successively sweep across a magnetic tape to provide successive recorded track portions including the video signal information, and a transducer unit which forms a marginal track including an editing signal.

It is another object of the present invention to provide a video signal recording and/or reproducing apparatus and method in which the video intelligence is recorded on successive track portions extending transversely of a magnetic pliable medium and in which the vertical synchronizing pulses occur at substantially the same transverse position on the tape in their respective track, and in which editing pulses are recorded on the margin of the tape at a predetermined fixed position with respect to the vertical synchronizing pulses.

These and other objects of the present invention will become more clearly apparent from the following description when taken in conjunction with the accompanying drawings.

Referring to the drawing.

Figure 1:
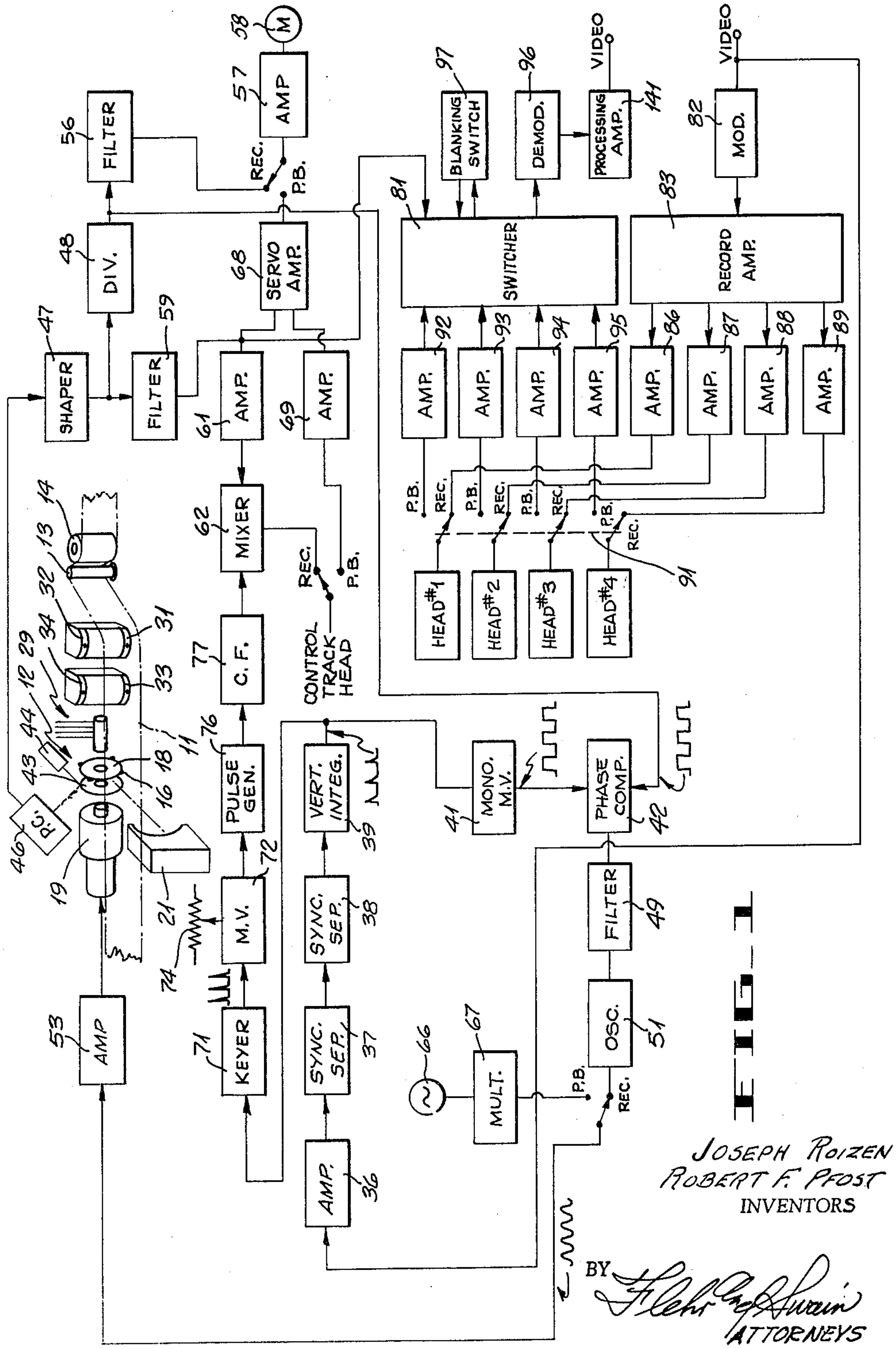
FIGURE 1 is a block diagram schematically illustrating magnetic tape recording and/or reproducing apparatus in accordance with the present invention.
Figures 2, 3:
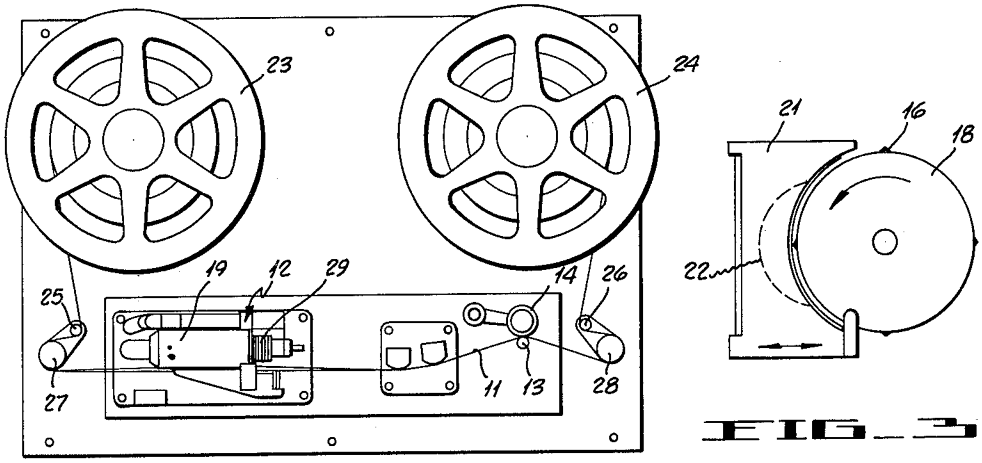
FIGURE 2 is a plan view illustrating a suitable tape transport assembly.
FIGURE 3 is an end elevational view illustrating the tape guide and head drum of FIGURES 1 and 2.

Referring to FIGURES 1 and 2, the magnetic tape 11 is driven lengthwise past the transducing head assembly 12 by means of a capstan drive 13 acting in conjunction with a capstan idler 14. A plurality of transducing heads or units 16 are carried on the periphery of a head disc or drum 18 which is driven by a synchronous motor 19. Suitable guide means 21 serve to cup and guide the tape as it is drawn past the transducing units. The guide means 21 may include a cut-out portion 22 to which a vacuum is applied to retain the tape in contact with the surface of the guide. As the transducing units sweep through their circular path, they are in continuous pressure contact with the tape.

The tape 11 is supplied from a supply reel 23 and wound onto a take-up reel 24. The tape is guided past the transducing head assembly 12 by suitable self-aligning guide posts 25 and 26 and rollers 27 and 28. The take-up reels may be carried on turntables in accordance with customary practice. Suitable motors may be provided for driving the turntables in accordance with customary practice.

The heads are connected to the electronic elements of the system by a commutator 29, schematically illustrated in FIGURES 1 and 2. The commutator may, for example, include slip rings connected to each one of the heads and stationary brushes serving to make sliding contacts with the associated rings.

During recording, the rotational velocity of the head drum 18 and of the capstan 13 are maintained with a specified relationship. During reproduction, the same relationship is maintained within narrow limits. For this purpose, a control signal is recorded on a control track along the lower margin of the tape by a magnetic transducing device 31. The control signal is recorded as a control track during recording and during reproduction it is reproduced, amplified and used to control the relative speeds of the head drum and capstan drive in a manner to be presently described. A recording head 32 serves to record the sound information along the other side margin of the tape. Sound track and control track erase heads 33 and 34 may precede the heads 31 and 32 respectively.

The electronic circuitry illustrated in block diagram in FIGURE 1 may be divided into speed control circuitry and signal recording circuitry. For a clear understanding of the invention, the two circuits are described separately.

Figure 7:
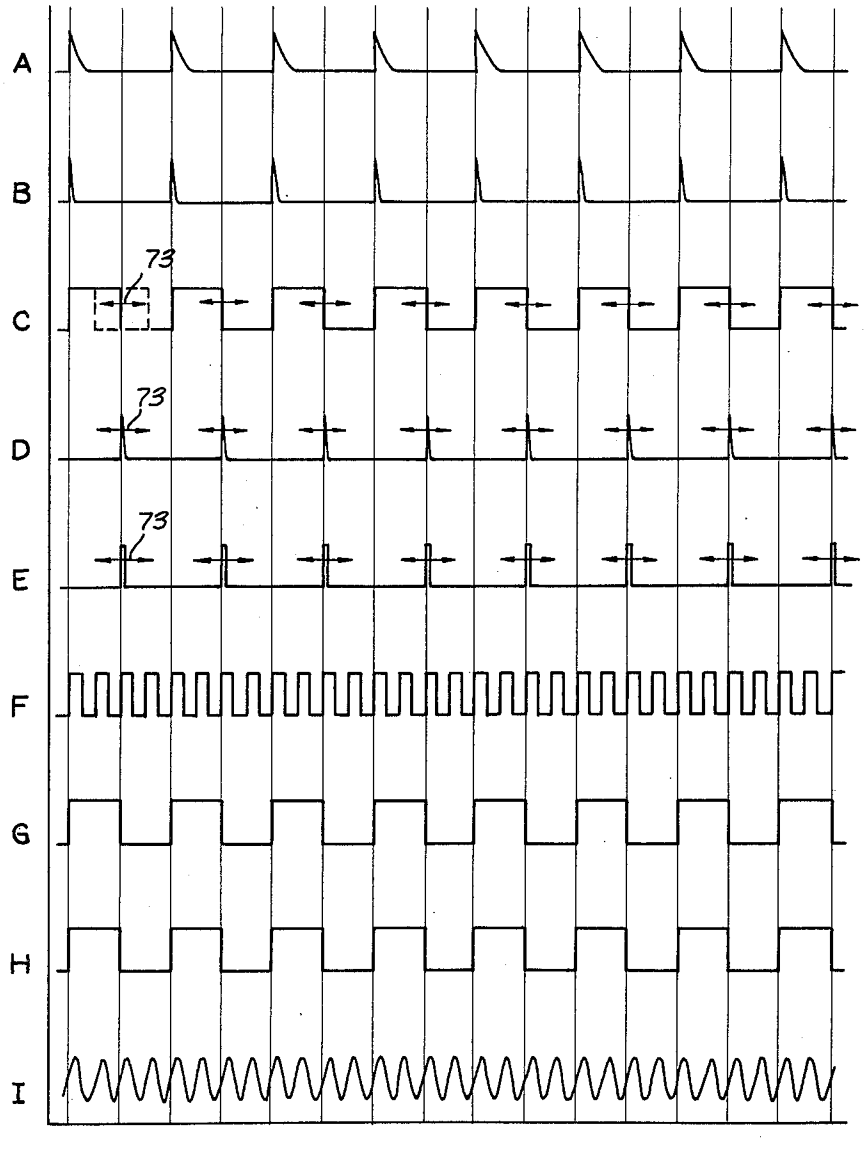
FIGURE 7 shows the pulses occurring at various parts of the circuit and their time relationship.

A control signal is derived from the video input signal. The video signal is applied to an amplifier 36 which serves to amplify the signal and apply the same to the sync separators 37 and 38 which serve to form pulses having the vertical synchronizing frequency. These pulses are applied to a vertical integrator 39 which forms pulses of the type shown in FIGURE 7A. For monochrome recording, the pulses have a 60 c.p.s. frequency. The output of the vertical integrator is applied to a mono-stable multivibrator 41 which forms a squarewave, FIGURE 7H. The squarewave is applied to a phase comparator 42.

A squarewave signal having a frequency and phase corresponding to the rotational velocity and position of the head drum is also applied to the phase comparator. The signal is derived by employing a revolving disc 43 which is driven by the synchronous motor 19 and which is coated half black and half white. A suitable light source 44 is focused on the disc and the reflected light from the disc is received by a photocell 46. The output of the photocell 46 is approximately a squarewave having a frequency equal to the rotational velocity of the synchronous motor 19. This wave is passed through a shaper 47 which gives a 240 c.p.s. signal of the type shown in FIGURE 7F. This signal is applied to a divider 48 which serves to divide down the frequency, FIGURE 7G. The output of the divider is applied to the phase comparator 42 which produces a voltage proportional to the phase difference between the signals applied thereto from the multivibrator 41 and the divider 48. This voltage is applied through a filter 49 to an oscillator 51. The oscillator 51 may be of the Wein bridge type including a reactance tube which is one of the frequency determining elements of the same. The signal output of the filter serves to control the frequency of the oscillator 51 which functions nominally at a frequency of 240 cycles but the frequency is modified up and down by means of the signal from the phase comparator. This signal is applied to an amplifier 53 which may be a three-phase amplifier for supplying power to the synchronous motor 19.

As previously described, the motor 19 serves to drive the head drum 18 which carries the transducer units 16. The output of the photocell 46 is a signal having a frequency of 240 c.p.s. The divider 48 divides this by four. Thus, the phase comparator has a pair of squarewaves, FIGURES 7G and H, having a nominal frequency of 60 cycles applied thereto. The phase between these two signals will depend upon the position of the disc 43. Differences in phase will produce a voltage output which changes the phase of the oscillator 51. The motor is speeded up or slowed down accordingly whereby the head drum rotates in synchronism with the vertical synchronizing information contained in the video signal being recorded. The effect of this system is to make recordings in which the vertical synchronizing pulses have a predetermined position within narrow limits.

The output of the divider 48 is also applied to the filter 56 which is preferably a band pass filter which forms an output signal of substantially sinewave from the squarewave applied thereto. During the record operation the output of the filter 56 is applied to an amplifier 57, and the amplified signal is employed to drive the capstan motor 58. Thus, the capstan motor is driven at a rotational velocity which is directly related to the rotational velocity of the head drum 18. In essence, the capstan is enslaved to the head drum. The tape moves a predetermined distance lengthwise during each complete revolution of the head drum.

The output from the shaper 47 is also applied through a filter 59 to a control track amplifier 61. The output of the amplifier 61 is applied to a mixer 62 which serves to mix this signal with an editing pulse, to be presently described. During the recording operation, the output of the mixer is applied to the record head 31 to form a record track along the margin, said record track including the edit signal and the speed control signal.

During reproduction, a control frequency source 66 provides the control frequency for the apparatus. The frequency 66 may, for example, be the 60 c.p.s. line frequency, or it may be derived from a crystal controlled oscillator. This signal is applied to a multiplier 67 which serves to multiply the frequency and to provide a 240 c.p.s. signal to the amplifier 53. The amplifier 53 serves to provide power for driving the synchronous motor which drives the head drum 18.

The motor drives the head drum at approximately the correct rotational velocity for the purposes of tracking the previously recorded transverse record. The photocell 46 again derives a signal which is shaped and passed to a filter 59. The signal from the filter 59 is fed to a phase comparator in the capstan servo amplifier 68. A second signal is applied to the phase comparator from the control track amplifier 69 which is connected to receive the output signal from the control track head during reproduction.

The comparator produces a resultant signal having a frequency which is a function of the phase difference between the signals from the control track and photocell. This signal is applied through a filter to the grid of a reactance tube which is one of the frequency determining elements of a conventional Wein bridge oscillator. The oscillator functions nominally at the recording frequency (in the illustrative example, 60 c.p.s.), but the frequency is modified up and down by the signal from the phase comparator. The output signal is fed to the amplifier 57 which drives the capstan motor 58 and controls its rotational velocity. Thus, the capstan motor advances the tape a predetermined distance during each revolution of the head drum whereby the plurality of heads 16 accurately track the record tracks.

The effect of the system described is to cause the capstan 13 to revolve during reproduction with exactly the same relationship to the revolving drum 18, within narrow limits, as it did during the recording process. Once the head drum is adjusted on the center of the track at the beginning of a reproduction, the system automatically holds the relationship constant and the revolving heads indefinitely trace accurately the recorded transverse tracks. A suitable control system is described in copending application Serial No. 506,102, filed May 5, 1955.

As previously described, an editing signal, which may be a pulse, is mixed with the control signal from the amplifier 61 and recorded on the control track. An edit pulse is generated for each of the vertical synchronizing pulses. Thus, an edit pulse is recorded on the control track for each of the fields of video intelligence that is recorded. For this purpose, the signal from the vertical integrator 39 is applied to a keyer 71 which forms a series of sharp pulses of the type shown in FIGURE 7B. The pulses are applied to a mono-stable multivibrator and serve to trigger the same. The multivibrator 72 includes means for controlling its period whereby the trailing edge of the output wave may be varied as indicated in FIGURE 7C by the arrow 73. Mono-stable multivibrators having an adjustable timing are well known in the art. The resistor 74 schematically represents the means for varying the duty cycle of the multivibrator. The output of the multivibrator 72 is applied to a capacitive-resistance differentiating network which serves to form a plurality of sharp spikes, FIGURE 7D, which have variable timing corresponding to the variable timing of the trailing edge of the squarewave form in FIGURE 7C. These spikes are applied to a suitable pulse generator 76 which forms a series of pulses of the type shown in FIGURE 7E. It is apparent that a pulse, FIGURE 7E, will occur for each of the vertical synchronizing pulses, and the pulse will have a predetermined time relationship with respect thereto. The output of the pulse generator 76 is applied to a cathode follower 77, and the output of the cathode follower to the mixer 66 where the editing pulses are mixed with the control signal from the amplifier 61. The editing pulses have an amplitude which serves to saturate the magnetic tape. Thus, it is seen that a series of editing pulses is provided, one for each vertical synchronizing pulse. Since rotation of the head drum is locked to the vertical synchronizing pulses, as previously described, the editing pulses will occur at a predetermined time with respect to the recorded vertical synchronizing pulses and will identify the fields.

As previously described, the lower portion of FIGURE 1 includes the video electronic circuitry. The only connection between the video electronics and the control electronics is the output filter 59 connected to the switcher 81. The signal from the filter 59 is employed, as will be presently described, to control the switching from one playback head to the next during reproduction to form a composite signal corresponding to the recorded signal.

The record electronics can consist of suitable means for producing a modulated carrier together with suitable recording amplifiers. FM recording is preferred, although AM recording may be used. Assuming the use of FM recording, the record electronics can consist of a modulator 82 which receives the input signal and a record amplifier 83 connected to receive the output of the modulator. The output from the record amplifier 83 is continuously applied to the individual head amplifiers 86–89. During recording, the switch 91 is positioned to connect the heads 1–4 to the amplifiers 86–89.

As described above, it is preferable to use FM recording. The type of FM recording which can be used for satisfactory recording and reproduction of video images is disclosed in copending application Serial No. 524,004, filed July 25, 1955, now Patent No. 2,956,114. It is also described in copending application Serial No. 552,868, filed December 13, 1955, now Patent No. 2,921,990.

During reproduction, the switch 91 is connected whereby the output of each head is fed individually to its own preamplifier 92–95. The preamplifiers are connected to feed their outputs to the switcher 81. From the switcher a single channel signal (combined signal) is fed to a demodulator 96. The switcher serves to electronically switch to the individual outputs of the amplifiers 92–95 sequentially and alternately as the respective heads are swept across the tape. The output of the switcher is a composite signal corresponding to the recorded signal.

It is apparent that during reproduction it is necessary to derive the amplified output signal from one head at a time, switching from one preamplifier to the next at a moment in the signal when minimum disturbance will be introduced in the reproduced signal. An electronic switcher may be employed and may be of the type described in copending application Serial No. 614,420, filed October 8, 1956, now Patent No. 2,968,692.

Figure 4:
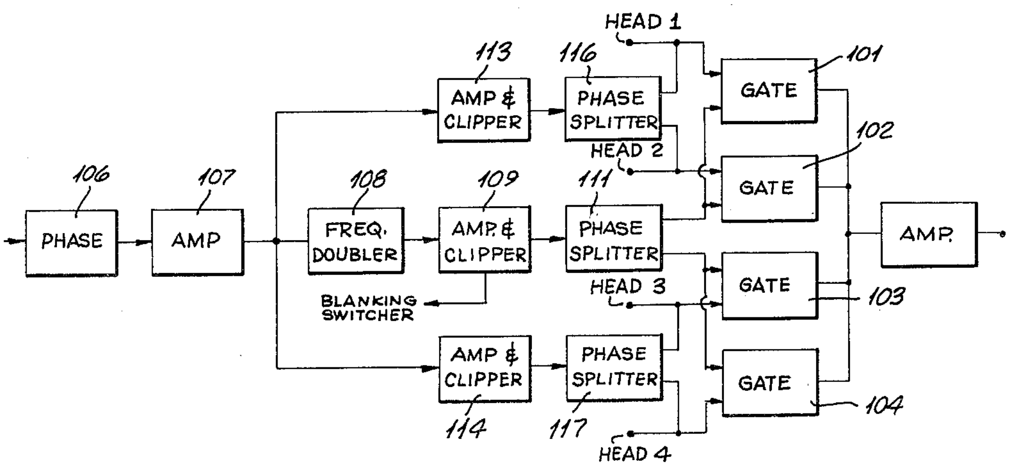
FIGURE 4 is a block diagram schematically illustrating a switcher suitable for performing the switching operations in the apparatus of FIGURE 1.

A switching system of this type is schematically illustrated in FIGURE 4 and includes four gated tubes 101–104 which act as individual switches for the signals from each of the four preamplifiers. Gating pulses for these tubes are derived from the initial squarewave generated by the photocell. The squarewave is amplified and filtered and enters the switcher as a 240 cycle sinewave. The duty of the switcher is to develop from this initial timing signal the propagating pulses necessary for switching the tubes 101–104 at the proper instant in time.

The 240 cycle input from the photocell passes through a variable phase shifter 106 and is amplified by an amplifier 107. Frequency doubling is performed by applying the signal to a full wave rectifier whose fundamental output frequency is 480 cycles. Harmonics are removed by a band pass filter to provide a pure 480 cycle signal to the amplifying and clipping stage 109. The reference numeral 108 refers to the combination of full wave rectifier and filter described. The amplifying and clipping stage 109 transforms the input into a steep sided squarewave or pulse. This pulse is then applied to the phase splitter 111 whose two outputs are 180° out-of-phase. The in-phase pulse is fed to the suppressor grids of the gating tubes 101 and 102 and the out-of-phase components are fed to the suppressor grids of the tubes 103 and 104.

The 240 cycle signal from the amplifier 107 is also fed to two identical amplifying and clipping means 113 and 114. After entering one of these channels, one of the signals is shifted 90° with respect to the other. The output from these channels is passed through phase splitters 116 and 117 to thereby develop four squarewave signals which are in-phase quadrature. These four signals are the four pulses used as enabling or gating pulses for the gating tubes 101–104. They are applied to the control grid along with the reproduced signal from the respective pick-up head.

Figure 5:
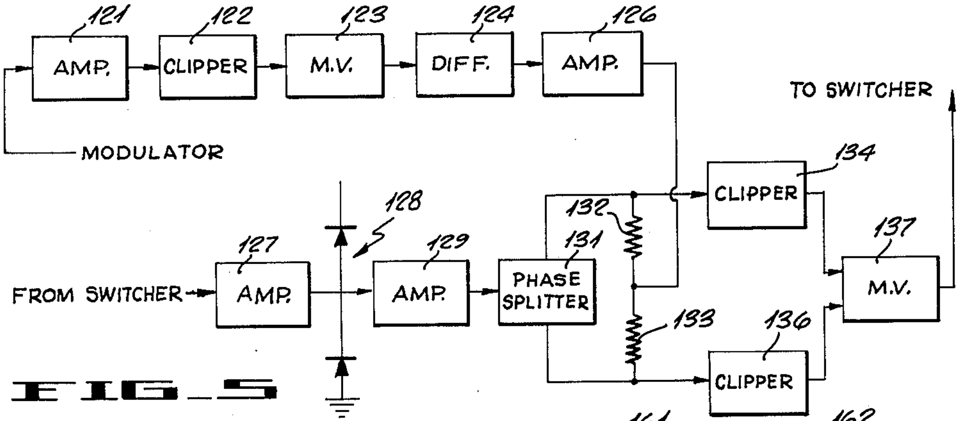
FIGURE 5 is a schematic block diagram showing a suitable blanking switcher for use in the system illustrated in FIGURE 1.

When reproducing television information, it is desirable to employ a blanking switcher 97 in conjunction with the switcher to provide timing information to cause the switching action to occur during horizontal blanking intervals. FIGURE 5 shows a block diagram of a suitable blanking switcher. The composite reproduced signal is fed to an amplifier 121 and clipper 122 whose output is made to lock in a 15,750 c.p.s. free running multivibrator 123. Trailing edge of the multivibrator pulse controls the switching time. A variable control is provided in the multivibrator whereby the switching time may be adjusted within the back porch interval. The squarewave output of the multivibrator 123 is differentiated by the differentiator 124, clipped and amplified by the amplifier 126 to produce a sharp pulse corresponding to the trailing edge of the squarewave. At the same instance, the 480 cycle keying signal from the switcher is applied and amplified by the amplifier 127 and applied to a phase splitter 128. The output of the phase splitter is applied to an amplifier 129 where it is amplified and applied to another phase splitter 131. The 15,750 c.p.s. pulse waveforms are added to the output of the phase splitter through resistors 132 and 133. The sum waveform is then clipped by the clippers 134 and 136 and applied to a multivibrator 137 which forms a squarewave output. Triggering of the multivibrator is so designed that pulses from the top channel will cause the multivibrator to flip only one polarity, while pulses from the lower channel cause the multivibrator to flip in the opposite polarity. The first pulse occurring in each group causes the multivibrator to flip. Both edges of the output squarewave correspond in time to the back porch video blanking interval. The output of the multivibrator 117 is applied to the amplifier-clipper 109 to regulate the switching time so that it occurs during the horizontal retrace of a video reproduced signal.

The output of the switcher is applied to demodulator 96 which serves to form a demodulated composite signal. The demodulated signal is preferably applied to a processing amplifier 141. The processing amplifier is designed to make the final output of the reproduced signal acceptable for rebroadcast or retransmission. Its main purpose is to eliminate all objectionable noise from (or in between) the blanking and sync pulses; and to limit to specified peak values any noise during the picture interval. In addition, the processing amplifier provides means for correcting video linearity and local or remote control of both video and sync levels. A processing amplifier suitable for performing these operations is described in detail in copending application Serial No. 636,536, filed January 8, 1957, now Patent No. 3,005,869.

To facilitate editing and/or splicing of the tape, it is desirable to "develop" the tape. Preferably, it is desirable to make the recorded editing pulses and tracks visible. A magnetic tape recording may be "developed" whereby the magnetic pattern may be visually observed by dispersing magnetic powder on the tape. For example, the tape may be sprayed with a volatile carrier which suspends carbonyl iron. When the coating is applied, the vehicle or carrier evaporates and leaves the carbonyl iron on the surface of the tape to expose the magnetic pattern. The density of the particles will be directly dependent upon the intensity of the underlying recording. Thus, the transverse tracks become visible, the control and sound tracks become visible, and the editing pulses which are points of saturation on the magnetic tape become visible.

Figure 6:
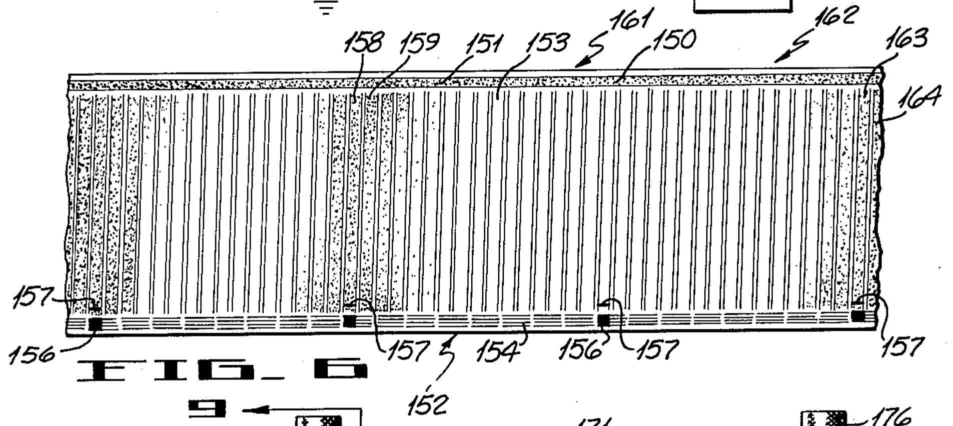
FIGURE 6 shows a portion of magnetic tape with the recordings "developed," said magnetic tape being enlarged in the longitudinal direction to more clearly illustrate the invention.

A "developed" recording showing the magnetic pattern is illustrated in FIGURE 6. The recording includes a sound track 151, a control track 152, and a transverse track 153. The control track has two recorded signals, the control frequency 154 and the edit pulses 156.

The recording shown in FIGURE 6 is expanded in its longitudinal direction for purposes of illustration. In a typical example the tape is 2 inches wide, the sound track 151 is .070 inch wide, and the control track 152 carried at the lower margin is .050 inch wide. The transverse tracks 153 are typically 1.86 inches long, .010 inch wide and spaced .005 inch from one another. Thus, a field (16 transverse tracks) occupies a distance of .250 inch along the tape.

Operation of the system to provide the editing pulses which identify fields and to position the vertical sync pulses will now be described in more detail. In the explanation to follow, reference will be made to the timing waveforms of FIGURE 7 and to the "developed" recording of FIGURE 6.

As previously described, during recording the oscillator 51 drives the amplifier 53 which powers the synchronous motor 19. The oscillator is adjusted to operate nominally at 240 cycles thereby driving the head drum 18 at 240 revolutions per second. The photocell derives a squarewave having the frequency of rotation of the disc which is divided down and compared in a phase comparator to a waveform derived from the vertical synchronizing pulses of the video signal being recorded. Any difference in phase will change the output frequency of the oscillator to bring it into phase. The head drum is in effect enslaved to the vertical synchronizing pulses whereby its rotational velocity and position is controlled by the same. As a result, the video recording on the transverse tracks 153 will always carry the vertical synchronizing pulses at a particular position on its respective track. Assuming four heads, the vertical synchronizing pulses will be recorded every 16th transverse track.

The control track portion 152 of the developed recording includes portions 154 which correspond to the recorded frequency from the photocell, that is, a 240 cycle signal and the dark portions 156 which correspond to the editing pulses. It is observed that the editing pulses occur every 16th scan line. Preferably, the editing pulses 156 occur adjacent to the transverse scan line which contains the vertical synchronizing pulses. For purposes of discussion, the lines 157 indicate a typical position for the vertical synchronizing pulses. Thus, it is seen that the editing pulses occur adjacent the corresponding transverse track portion and have a length substantially equal to the width of the track portion. The length may be easily controlled by adjusting the pulse generator 76 and its position (phase) may be adjusted by adjusting the mono-stable multivibrator 72. In editing, them, the tape is cut at a point between the track portion 158 which includes the vertical synchronizing information and the succeeding track portion 159. Thus, a complete field is left on the recording. If it is desired to edit out several fields, as for example, the fields 161 and 162, the tape is then cut between the lines 163 and 164. When the tape is spliced, the line 164 will lie adjacent to the transverse track 158 and no difference in vertical synchronizing timing information occurs since the vertical sync pulse occurred at the end of the line and the next field starts as if no editing had been done.

Figure 8:
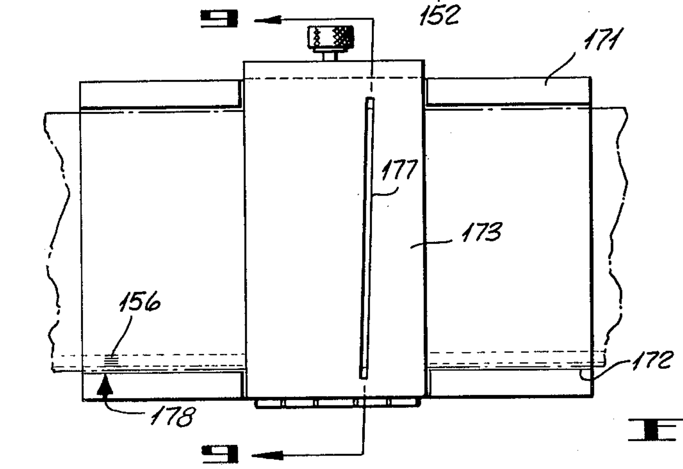
FIGURE 8 shows an elevational view of a tape cutting and splicing jig.
Figure 9:
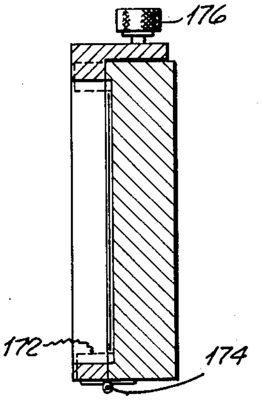
FIGURE 9 is a sectional view taken along the line 9—9 of FIGURE 8.

Referring to FIGURES 8 and 9, apparatus suitable for cutting the tape is illustrated. Thus, the apparatus includes a base 171 having a channel 172 formed therein which serves to receive and guide the tape. A cutting guide 173 is hinged 174 to one side of the base whereby it may be lifted to free the tape and be clamped by a thumb screw 176, or the like, for cutting. When the guide is in its down position, a cutting tool may be inserted in the slot 177 and serve to cut the underlying tape. The slot 177 is inclined at an angle corresponding to the angle of the transverse recording whereby the tape is accurately cut between recordings. The base 171 may carry an indicator 178 for positioning the tape whereby it is assured that the tape is cut between transverse recordings. The indicator 178 is then positioned adjacent a predetermined edge of the editing pulse 156 and a cutting tool is inserted in the slot 177 and the tape cut off. The spacing of the indicator 177 from the slot is such that the next field is left on the tape.

Thus, it is seen that a novel video recording and/or reproducing apparatus and method is provided. The apparatus provides means for positioning the vertical synchronizing pulses on the tape and for applying editing pulses. The tape may be spliced without introducing timing discontinuities which would disturb the synchronism of a receiver.

We claim:

1. In magnetic recording and/or reproducing apparatus of the type adapted to record a video signal including vertical synchronizing waveforms, a rotary head serving to carry a plurality of transducer units whereby the units sweep through circular paths, motive means serving to rotate said rotary head, tape engaging and guiding means adapted to guide a length of tape for movement in proximity with a circular sweep path of said transducer units, means serving to receive at least a portion of said video signal and forming editing signals having the vertical synchronizing frequency, means serving to derive a signal representative of the velocity of rotation of said rotary head, means for comparing the editing signal frequency and the signal and serving to derive a control voltage which is proportional to their phase difference, and an oscillator serving to apply power to said motive means and adapted to be controlled by said control voltage.

2. In magnetic recording and/or reproducing apparatus of the type adapted to record a video signal including vertical synchronizing waveforms, a rotary head assembly serving to carry a plurality of transducer units whereby the units sweep through circular paths, motive means for rotating said head assembly, means for moving a length of tape in proximity with the circular sweep path of the heads, means serving to receive at least a portion of said video information and form a first signal having the frequency of the vertical synchronizing waveforms, means serving to derive a second signal having frequency corresponding to the rotational velocity of the head assembly, phase comparison means serving to receive said first and second signals and derive a control voltage, means driving said motive means, said last named means having an output frequency which is controlled by said control voltage whereby said rotary head assembly has a predetermined positional relationship with respect to the vertical synchronizing waveform, means receiving said video signal and forming editing pulses in response to the vertical synchronizing waveforms, and means serving to receive said editing pulses and form a record on the side margin of the tape, said record serving to identify the fields of the recorded video signal.

3. The combination of claim 2 wherein the means for receiving said video signal and forming editing pulses in response to the vertical synchronizing waveforms is further characterized in that the editing pulses have an amplitude of a value to provide magnetic saturation of the tape when applied to the record means.

References Cited in the file of this patent

UNITED STATES PATENTS

| | | |
|---|---|---|
| 2,245,286 | Marzocchi | June 10, 1941 |
| 2,530,564 | Blaney | Nov. 21, 1950 |
| 2,632,815 | Crespinel | Mar. 24, 1953 |
| 2,976,635 | Banning et al. | May 21, 1961 |

OTHER REFERENCES

R.C.A. TN No. 20, Magnetic Video Tape Editing Apparatus, August 9, 1957.